United States Patent
Zhao et al.

(10) Patent No.: US 10,364,388 B2
(45) Date of Patent: **\*Jul. 30, 2019**

(54) PHASE CHANGE FRACTURING FLUID SYSTEM FOR PHASE CHANGE FRACTURING

(71) Applicant: SOUTHWEST PETROLEUM UNIVERSITY, Chengdu (CN)

(72) Inventors: Liqiang Zhao, Chengdu (CN); Yong Yang, Cangzhou (CN); Guangyan Du, Chengdu (CN); Donghe Yu, Cangzhou (CN); Juan Du, Chengdu (CN); Hang Che, Cangzhou (CN); Zhifeng Luo, Chengdu (CN); Guohua Liu, Cangzhou (CN); Yuxin Pei, Chengdu (CN); Nianyin Li, Chengdu (CN); Pingli Liu, Chengdu (CN); Kun Xu, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/775,009

(22) PCT Filed: Sep. 20, 2016

(86) PCT No.: PCT/CN2016/099425
§ 371 (c)(1),
(2) Date: May 10, 2018

(87) PCT Pub. No.: WO2018/006498
PCT Pub. Date: Jan. 11, 2018

(65) Prior Publication Data
US 2018/0340116 A1 Nov. 29, 2018

(30) Foreign Application Priority Data
Jul. 7, 2016 (CN) .......................... 2016 1 0534192

(51) Int. Cl.
*C09K 8/64* (2006.01)
*C09K 8/80* (2006.01)
(Continued)

(52) U.S. Cl.
CPC .................. *C09K 8/64* (2013.01); *C09K 8/68* (2013.01); *C09K 8/80* (2013.01); *C09K 8/88* (2013.01); *E21B 43/26* (2013.01)

(58) Field of Classification Search
CPC ..................................................... E21B 43/26
See application file for complete search history.

(56) References Cited

U.S. PATENT DOCUMENTS 3,603,400 A    9/1971  Son, Jr.
5,633,220 A    5/1997  Cawiezel et al.
(Continued)

FOREIGN PATENT DOCUMENTS

CN    101346324 A    1/2009
CN    102124074 A    7/2011

OTHER PUBLICATIONS

Xu Lizhong et al., The Synthesis and Characterization of Macroporous Poly( vinyl acetate-co-triallyl isocyanurate) Beads, Journal of Functional Polymers, Jun. 1996, pp. 183~187.
(Continued)

*Primary Examiner* — William D Hutton, Jr.
*Assistant Examiner* — Avi T Skaist
(74) *Attorney, Agent, or Firm* — Gokalp Bayramoglu

(57) ABSTRACT

The present invention discloses a phase change fracturing fluid system for phase change fracturing, including the following components in percentage by weight: 10%-40% of supramolecular construction unit, 0-40% of supramolecular function unit, 0.5%-2% of surfactant, 0-5% of inorganic salt, 0.5%-2% of oxidizing agent, 0-2% of cosolvent and the remaining of solvent. The supramolecular construction unit
(Continued)

| Sample | Bulk Density g/cm³ | Apparent density g/cm³ | Breakage rate | | |
|---|---|---|---|---|---|
| | | | Under pressure 52MPa | Under pressure 86MPa | Under pressure 96MPa |
| FfP1 | 0.44 | 1.03 | ≤0.35 | ≤10 | ≤25 |
| FfP2 | 0.52 | 1.04 | ≤0.35 | ≤10 | ≤25 |
| FfP3 | 0.48 | 1.03 | ≤0.35 | ≤10 | ≤25 | is melamine, triallyl isocyanurate, or a mixture thereof. The supramolecular function unit is vinyl acetate, acrylonitrile, or a mixture thereof. The solvent is methylbenzene, ethylbenzene, o-xylene, m-xylene or p-xylene. In the fracturing construction process, a conventional fracturing fluid is used for fracturing a formation first; the phase change fracturing fluid is then injected into the formation, or the phase change fracturing fluid and other fluids which cannot be subjected to phase change are injected into the formation together.

6 Claims, 1 Drawing Sheet

(51) Int. Cl.
   *E21B 43/26* (2006.01)
   *C09K 8/68* (2006.01)
   *C09K 8/88* (2006.01)

(56) References Cited

U.S. PATENT DOCUMENTS

| 6,849,581 | B1* | 2/2005 | Thompson | C11D 3/2075 |
| | | | | 507/103 |
| 2014/0332214 | A1* | 11/2014 | Zhou | E21B 43/267 |
| | | | | 166/280.2 |

OTHER PUBLICATIONS

Sixue Ji et al. Effect of Chemical on Gel Breaking of Associative Structure Fracturing Fluid, Drilling Fluid & Completion Fluid, Jan. 30, 2016, ISSN: 1001-5620, vol. 33 No. 1.

\* cited by examiner

| Sample | Bulk Density g/cm$^3$ | Apparent density g/cm$^3$ | Breakage rate | | |
|---|---|---|---|---|---|
| | | | Under pressure 52MPa | Under pressure 86MPa | Under pressure 96MPa |
| FfP1 | 0.44 | 1.03 | ≤0.35 | ≤10 | ≤25 |
| FfP2 | 0.52 | 1.04 | ≤0.35 | ≤10 | ≤25 |
| FfP3 | 0.48 | 1.03 | ≤0.35 | ≤10 | ≤25 |

PHASE CHANGE FRACTURING FLUID SYSTEM FOR PHASE CHANGE FRACTURING

CROSS REFERENCE TO RELATED APPLICATIONS

This application is the national phase entry of International Application PCT/CN2016/099425, filed on Sep. 20, 2016, which is based upon and claims priority to Chinese Patent Application No. 201610534192.3, filed on Jul. 7, 2016, the entire contents of which are incorporated herein by reference.

TECHNICAL FIELD

The present invention relates to a hydraulic fracturing stimulation technology for reservoirs in the process of petroleum development, belonging to the field of researches on supramolecular chemistry and self-assembly nanotechnology, in particular to a phase change fracturing fluid system based on supramolecular self-assembly.

BACKGROUND

The hydraulic fracturing technology has been widely used in the development of oil and gas fields as a major measure for increasing production of oil and gas wells and augmented injection of water wells, and has made important contributions to stable production and stable injection of oil and gas fields. Hydraulic fracturing refers to pumping high-viscosity pre-flush fluid into a target reservoir, forming fractures at high pressure and extending the fractures, and then pumping sand-carrying fluid mixed with a proppant, wherein the sand-carrying fluid can continue to extend the fractures, and at the same time carry the proppant deep into the fractures. It is best to break and degrade the fracturing fluid into low-viscosity fluid which then flows to the bottom of the well and later flows back, thereby leaving a flow channel with high flow conductivity formed by the proppant supporting the fracture wall in the formation to facilitate flowing of oil and gas from the far-field formation to the bottom of the well.

However, from the point of view of the hydraulic fracturing technology and its development, all fracturing technologies are currently based on the process of forming fractures with a fracturing fluid, then injecting a solid proppant to hydraulic fractures, and supporting the fractures to keep them open, thereby obtaining a flow channel with high flow conductivity. In 2010, Schlumberger proposed that the flow conductivity of fractures in a HIWAY high-speed channel was not affected by the permeability of a proppant. Compared with the conventional fracturing technology, this technology also needs to inject a solid phase proppant into a formation, and the process is complicated to implement.

During the construction process, the injection of the solid proppant can easily cause sand removal, sand plugging, and injection failure, so the construction cannot achieve the desired effect, and even cause blockage in a wellbore with sand. Petroleum workers have been working on the research of low-density and high-strength proppant for the purpose of making the proppant easy to inject. Whatever it is a low-density or high-density proppant, the solid proppant needs to be injected from the wellhead into the formation. However, the solid proppant in the conventional sand-blast fracturing process may cause problems such as difficult injection and difficult injection. In order to improve the fracturing construction effect, the present invention provides a new construction process—a fracturing process without a proppant, which specifically comprises: injecting a phase-changeable supramolecular fracturing fluid based on supramolecular self-assembly into the formation, wherein the fracturing fluid on the ground is a flowable liquid phase, and the flowable liquid phase is formed into a solid phase 20-240 min after being injected into the formation at a formation temperature, so as to support the fracture wall, thereby forming a channel with high flow conductivity in the formation.

SUMMARY

Technical Problem

The present invention aims to provide a phase change fracturing fluid system for phase change fracturing. The phase change fracturing fluid is formulated on the ground and injected into the formation easily because of its low viscosity and good fluidity. After the phase-change fracturing fluid enters a reservoir and reacts at a reservoir temperature of 60-120° C. for 20-240 minutes, constitutional units of the supramolecular material in the phase-change fracturing fluid are self-assembled to form a solid phase material with certain strength by using an entropy-driven order theory, thereby supporting fractures. The supramolecular phase change fracturing fluid system is used for phase change fracturing, is simple, safe and efficient in construction operation, and has a broad market prospect.

Solution to the Problems

Technical Solution

To fulfill the above-mentioned technical objective, the present invention provides the following technical solution.

A phase change fracturing fluid system for phase change fracturing comprises the following components in percentage by weight: 10%-40% of supramolecular construction unit, 0-40% of supramolecular function unit, 0.5%-2% of surfactant, 0-5% of inorganic salt, 0.5%-2% of oxidizing agent, 0-2% of cosolvent and the balance of solvent.

The supramolecular construction unit is melamine, triallyl isocyanurate, or a mixture thereof.

The supramolecular function unit is vinyl acetate, acrylonitrile, or a mixture thereof.

The surfactant is one or more of sodium dodecylbenzenesulfonate, Tween 20, Tween 40, and cetyl trimethylammonium bromide.

The inorganic salt is one or more of sodium phosphate, calcium chloride, and magnesium chloride.

The oxidizing agent is hydrogen peroxide, ammonium persulfate, or sodium dichromate.

The cosolvent is polyethylene glycol, polyvinyl pyrrolidone, or a mixture thereof.

The solvent is toluene, ethylbenzene, o-xylene, m-xylene or p-xylene.

In the fracturing construction process, a conventional fracturing fluid is used for fracturing a formation first; the phase change fracturing fluid well formulated on the ground is then injected into the formation, or the phase change fracturing fluid and other fluids (including formation water, seawater, fracturing fluid) which cannot be subjected to phase change are injected into the formation together. The properties of the phase change fracturing fluid cannot be affected when the phase change fracturing fluid is mixed with formation water, seawater, fracturing fluid, etc., so the construction operation is easy, convenient, safe and efficient.

Beneficial Effects

Compared with the prior art, the present invention has the following beneficial effects: The present invention is suitable for phase change fracturing. The phase change fracturing is suitable for fracturing stimulation and augmented injection of conventional sandstone oil reservoirs, carbonate oil reservoirs and other complex oil and gas reservoirs. Compared with the conventional hydraulic pressure, the present invention, instead of injecting a solid phase proppant into a formation, injects a phase-change fracturing fluid into the fractured formation. The phase-change fracturing fluid is a flowable liquid phase on the ground and in the injection process. Under supramolecular chemical and physical actions, the phase change fracturing fluid forms solid matters to support the cracks. Because there is no injection of solid phase, the friction resistance of a pipe string can be effectively reduced, the requirements for construction equipment, ground pipelines, wellheads and construction pipe string are reduced, and the construction cost is effectively reduced. At the same time, construction risks and potential safety hazards are reduced. Compared with the existing conventional hydraulic fracturing technology, the present invention does not need to inject the solid phase proppant into the formation. The phase change fracturing fluid of the present invention is convenient, safe, and efficient for fracturing construction.

BRIEF DESCRIPTION OF THE DRAWINGS

FIG. 1 is a comparison table of solid phase properties of a phase change fracturing fluid after phase change.

DETAILED DESCRIPTION

Embodiments of the Invention

Example 1

A phase change fracturing fluid FfP1 is formulated by taking 50 g of toluene first, then adding 5 g of melamine, 5 g of triallyl isocyanurate, 10 g of vinyl acetate, 1 g of sodium dodecylbenzenesulfonate, 0.5 g of hydrogen peroxide, and 1 g of polyethylene glycol in sequence, placing all the materials in a flask and stirring uniformly at room temperature.

The well-stirred FfP1 flask is placed in a constant-temperature oil bath, and heated to 80-90° C. to react for 0.5 to 5 hour, and then heating is stopped. The flask is taken out, and a beaded or blocky solid phase material is observed in the FfP1 sample. It is indicated that the phase-change fracturing fluid FfP1 can be used for phase-transition fracturing and can achieve liquid-to-solid transition.

Example 2

A phase change fracturing fluid FfP2 is formulated by taking 50 g of xylene, then adding 12 g of melamine, v10 g of vinyl acetate, 2 g of acrylonitrile, 0.5 g of sodium dodecylbenzenesulfonate, 0.5 g of Tween 20, 2 g of sodium phosphate, and 0.5 g of ammonium persulfate, and stirring uniformly at room temperature.

The well-stirred FfP2 flask is placed in a constant-temperature oil bath, and heated to 90-100° C. to react for 0.5 to 5 hour, and then heating is stopped. The flask is taken out, and a beaded or blocky solid phase material is observed in the FfP2 sample. It is indicated that the phase-change fracturing fluid FfP2 can be used for phase-transition fracturing and can achieve liquid-to-solid transition.

Example 3

A phase change fracturing fluid FfP3 is formulated by taking 50 g of ethylbenzene, then adding 10 g of melamine, 4 g of triallyl isocyanurate 4 g, 10 g of acrylonitrile 10 g, 0.5 g of sodium dodecylbenzenesulfonate, 0.5 g of cetyl trimethylammonium bromide, 2 g of calcium chloride, 1 g of hydrogen peroxide, and 1 g of polyvinylpyrrolidone, and stirring uniformly at room temperature.

The well-stirred FfP3 flask is placed in a constant-temperature oil bath, and heated to 70-80° C. to react for 0.5 to 5 hour, and then heating is stopped. The flask is taken out, and a beaded or blocky solid phase material is observed in the FfP3 sample. It is indicated that the phase-change fracturing fluid FfP3 can be used for phase-transition fracturing and can achieve liquid-to-solid phase transition.

The data in Table 1 shows that the solid phase density after phase change is low, and therefore the phase change fracturing fluid may not be easily deposited t the bottom of the fracture in the formation. For a long time, the development of fracturing proppants has been pursuing low density (the bulk density of conventional proppants is approximately 1.2 to 1.6 g/cm$^3$ and the apparent density is approximately 2.7 to 3 g/cm$^3$). However, the phase change fracturing fluid provided by the present invention after phase change has extremely low solid phase density for supporting. The breakage rate of the pressure-borne solid material for supporting in the phase change fracturing fluid provided by the present invention after phase change is very low. If it is under pressure in the formation, the supporting to the fracture can be realized completely, so that the reservoir under pressure has a higher backflow capability.

What is claimed is:

1. A phase change fracturing fluid system for phase change fracturing, comprising:
   a supramolecular construction unit of 10%-40% by weight,
   a supramolecular function unit of >0% and ≤40% by weight,
   a surfactant of 0.5%-2% by weight,
   an inorganic salt of >0% and ≤5% by weight,
   an oxidizing agent of 0.5%-2% by weight,
   a cosolvent of >0% and ≤2% by weight, and
   a solvent of a remaining ratio by weight; and wherein
   the supramolecular construction unit is a triallyl isocyanurate;
   the supramolecular function unit is a vinyl acetate, an acrylonitrile, or a mixture of the vinyl acetate and the acrylonitrile.

2. The phase change fracturing fluid system for phase change fracturing according to claim 1, wherein the surfactant is one or more selected from the group consisting of sodium dodecylbenzenesulfonate, and cetyl trimethylammonium bromide.

3. The phase change fracturing fluid system for phase change fracturing according to claim 1, wherein the inorganic salt is one or more selected from the group consisting of sodium phosphate, calcium chloride, and magnesium chloride.

4. The phase change fracturing fluid system for phase change fracturing according to claim 1, wherein the oxidizing agent is a hydrogen peroxide, an ammonium persulfate, or a sodium dichromate.

5. The phase change fracturing fluid system for phase change fracturing according to claim 1, wherein the cosolvent is a polyethylene glycol, a polyvinyl pyrrolidone, or a mixture of the polyethylene glycol and the polyvinyl pyrrolidone.

6. The phase change fracturing fluid system for phase change fracturing according to claim 1, wherein the solvent is a toluene, an ethylbenzene, an o-xylene, a m-xylene or a p-xylene.

* * * * *